United States Patent
Oren et al.

(10) Patent No.: US 10,405,045 B2
(45) Date of Patent: Sep. 3, 2019

(54) SYSTEMS AND METHODS FOR ESTIMATING USER ATTENTION

(71) Applicant: Google Inc., Mountain View, CA (US)

(72) Inventors: Eyal Oren, Los Gatos, CA (US); Farzan Rohani, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/015,972

(22) Filed: Feb. 4, 2016

(65) Prior Publication Data
US 2017/0171620 A1    Jun. 15, 2017

Related U.S. Application Data

(60) Provisional application No. 62/267,081, filed on Dec. 14, 2015.

(51) Int. Cl.
*H04N 21/466* (2011.01)
*H04N 21/658* (2011.01)
(Continued)

(52) U.S. Cl.
CPC ......... *H04N 21/4667* (2013.01); *G06Q 30/02* (2013.01); *H04N 21/252* (2013.01);
(Continued)

(58) Field of Classification Search
CPC ........... H04N 21/4667; H04N 21/6582; H04N 21/44222; H04N 21/44218; H04N 21/2543; H04N 21/252; H04N 21/4532; H04N 21/25866; H04N 21/440281; G06Q 30/02; G06Q 30/0241
See application file for complete search history.

(56) References Cited

U.S. PATENT DOCUMENTS

| | | | |
|---|---|---|---|
| 8,468,056 B1 * | 6/2013 | Chalawsky | H04N 21/2547 705/14.41 |
| 2004/0133909 A1 * | 7/2004 | Ma | G06Q 30/0207 725/34 |

(Continued)

OTHER PUBLICATIONS

International Search Report and Written Opinion for related Application No. PCT/US2016/060669; dated Feb. 9, 2017.
(Continued)

*Primary Examiner* — Benjamin R Bruckart
*Assistant Examiner* — Tien M Nguyen
(74) *Attorney, Agent, or Firm* — Foley & Lardner LLP

(57) ABSTRACT

The present disclosure provides systems and methods for estimating audience member engagement with content, or distinguishing between users consuming content and users who have become distracted or have left. User presence or attention may be estimated from user interactions with or skipping of content, with the user interactions either compared to high quality engagement data from small audience measurement panels, or extrapolated based on a temporal-engagement curve. An attention gap may be estimated, representing users that were not present for or not engaged with or paying attention to a presentation of content at a client device. This allows the measurement system to distinguish between users who consumed and potentially enjoyed the content, and users who did not, even as client devices of both sets of users receive and present the content items.

16 Claims, 10 Drawing Sheets

(51) Int. Cl.
　　　*H04N 21/442*　　　(2011.01)
　　　*H04N 21/2543*　　(2011.01)
　　　*H04N 21/25*　　　(2011.01)
　　　*H04N 21/45*　　　(2011.01)
　　　*H04N 21/258*　　　(2011.01)
　　　*G06Q 30/02*　　　(2012.01)

(52) U.S. Cl.
　　　CPC ... *H04N 21/2543* (2013.01); *H04N 21/25866* (2013.01); *H04N 21/44218* (2013.01); *H04N 21/44222* (2013.01); *H04N 21/4532* (2013.01); *H04N 21/6582* (2013.01); *H04N 21/44213* (2013.01); *H04N 21/658* (2013.01)

(56) References Cited

U.S. PATENT DOCUMENTS

| | | | | |
|---|---|---|---|---|
| 2010/0088714 | A1* | 4/2010 | Hawkins | H04H 20/14 725/14 |
| 2010/0095317 | A1* | 4/2010 | Toebes | H04N 7/163 725/9 |
| 2010/0125871 | A1* | 5/2010 | Liao | G06Q 30/02 725/34 |
| 2011/0231868 | A1 | 9/2011 | Martens | |
| 2012/0227063 | A1* | 9/2012 | Tsurumi | H04N 21/251 725/10 |
| 2014/0040019 | A1 | 2/2014 | Zheng et al. | |
| 2014/0278308 | A1* | 9/2014 | Liu | H04L 67/22 703/6 |

OTHER PUBLICATIONS

International Preliminary Report on Patentability for PCT/US2016/060669, dated Jun. 28, 2018.

* cited by examiner

SYSTEMS AND METHODS FOR ESTIMATING USER ATTENTION

CROSS-REFERENCES TO RELATED APPLICATIONS

This application claims the benefit of priority under 35 U.S.C. § 119 to U.S. Provisional Application No. 62/267,081, filed on Dec. 14, 2015, which is hereby incorporated by reference herein in its entirety.

BACKGROUND

Content providers will pay content distribution systems different rates based on audience size, with higher rates per content presentation or view for larger audiences. With unicast Internet delivery, instances of content presentation may be accurately measured, with content delivery servers accurately reporting the number of client devices to which any item of content was delivered. While it may be easy to assume that every instance of delivery results in a user paying attention to or actively consuming the content, this may not always be true. A user's attention may be drawn elsewhere such that they do not actively consume the content, or the user may leave the immediate area without pausing or stopping the media stream resulting in presentation of content to an empty room. Content providers may not wish to pay for such presentations.

Additionally, content selection systems for personalized or custom content delivery may use presentation statistics to determine which users or demographics are interested in what types of content. Assuming that all users are engaged or interested in all content that is delivered to their client devices may exaggerate the actual interest rate in some items, resulting in incorrect selections and user dissatisfaction with the content selection system.

SUMMARY

User presence or attention may be estimated from user interactions with or skipping of content, with the user interactions either compared to high quality engagement data from small audience measurement panels, or extrapolated based on a temporal-engagement curve. An attention gap may be estimated, representing users that were not present for or not engaged with or paying attention to a presentation of content at a client device. This allows the measurement system to distinguish between users who consumed and potentially enjoyed the content, and users who did not, even as client devices of both sets of users receive and present the content items.

In one aspect, an audience measurement system can use content with known interest rates that may be determined at a high quality via small panels or marketing surveys. The same content may be subsequently presented to a general audience, with audience engagement measured via interactions with the content (e.g. click-throughs, skips, survey selections, etc.). An audience interaction rate measured using skips, for example, may directly identify a percentage of users who are actively engaged, but not interested in the content (e.g. who explicitly skip over the content); but may over-represent users who consume and enjoy the content without skipping the content by including in this number users who are not present or not engaged with the content. An attention gap may be identified as a difference between the known interest rate and the measured interaction rate. Under an assumption that if all users were engaged with the content, the audience interaction rate would be similar to the interaction rate for the small high quality panel, the attention gap thus represents the portion of users who are not engaged with or present for the presentation of content. The percentage of engaged and interested users may thus be determined, and content providers charged per active view or selection algorithms adjusted. The same attention gap may be used to estimate engagement for prior or subsequent presentations of content.

In another aspect, the audience measurement system can utilize a temporal engagement curve based on similar or identical content of different durations. This allows engagement or attention measurement without requiring the use of a panel to determine a baseline. It may be assumed that if an item of content is of infinite duration, every user paying attention to the presentation of the content would eventually choose to skip or terminate the presentation—and thus, with 100% audience engagement or interest, there would be a corresponding eventual 100% skip rate. Accordingly, any difference between the theoretical 100% skip rate and a skip rate that may be extrapolated from skip rates for content of shorter durations represents an attention gap, or a percentage of non-engaged or not present users. In one such implementation, similar or identical content of various lengths may be presented to an audience, such as 30 seconds, 1 minute, 2 minutes, etc., and skip rates measured. A best fit curve may be determined and extrapolated out for similar content of infinite duration, such that the attention gap may be calculated. This gap may then be applied to the earlier measurements to estimate the percentage of engaged, interested users for each presentation of content.

These techniques may be used separately or in conjunction, and may use any type of content (e.g. streamed audio or video; television programming; pre-roll, post-roll, or interstitial advertising; etc.), and any type of interaction (skip, rewind, click-through, vote, social media "likes", sharing, etc.).

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1A:
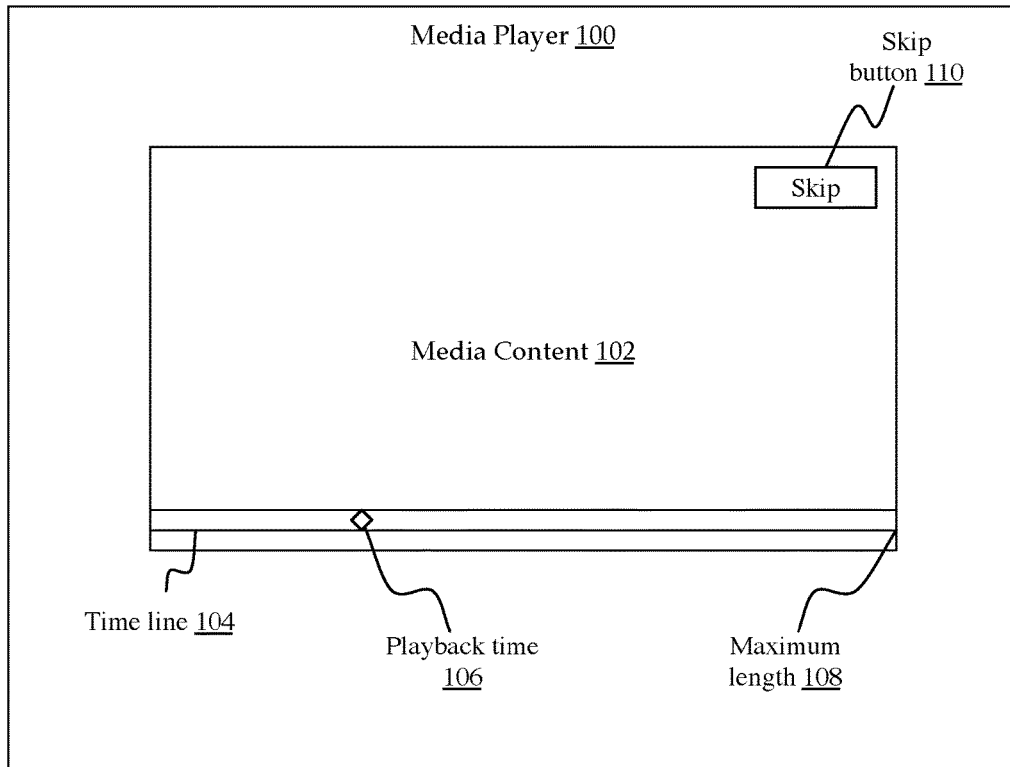
FIG. 1A is an illustration of an implementation of a media player allowing user interaction.

Media or other content may be provided to client devices, including desktop computers, laptop computers, tablets or smart phones, video game consoles, smart televisions, wearable computers, or any other type and form of client device capable of presenting content to a user. The content may be of any type and form, including text, audio, video, interactive applications, games, or other media. In many implementations, content may be created by publishers, generally referred to as content providers; and may be delivered to client devices by content distribution systems having infrastructure and bandwidth for delivering the content to thousands or millions of client devices simultaneously.

In many implementations, content distribution systems may charge content providers based on the number of recipients or audience size, typically measured by the number of client devices to which the content is delivered. With streamed media or similar content delivered responsive to a request (e.g. Hypertext Transport Protocol (HTTP) GET requests; Real Time Streaming Protocol (RTSP) PLAY requests; Real-time Transport Protocol (RTP) requests; or other type and format of requests), the number of requests (or responses) may be measured directly by the content distribution system in some implementations. In other systems, such as with multicast protocols or broadcast systems, in some implementations, a device such as a cable demodulator or decoder or set top box may transmit an identification of channel tuning or receipt of content to a content distributor.

Content providers typically pay content distribution systems different rates based on audience size, with higher rates per content presentation or view for larger audiences. However, while content may be delivered to and presented by a client device, a user may or may not be actually present or may be distracted by other content or events. For example, many implementations of streaming media or multimedia broadcasts include additional pre-roll, post-roll, or interstitial content, such as advertising. Audience members may look at other devices, leave the room (e.g. to get a snack), or otherwise not pay attention during presentation of this additional content. As a result, while some devices may receive and present content, it may be incorrect to assume that every such presentation represents a view by an audience member.

Additionally, content providers, producers, and publishers frequently make production decisions based on popularity of content to an audience or relevant demographic, such as creating content similar to popular content, or canceling presentation of unpopular content. Similarly, content selection systems for personalized or custom content delivery may use presentation statistics to determine which users or demographics are interested in what types of content. A false assumption that all users are engaged or interested in all content that is delivered to their client devices may exaggerate the actual interest rate in some items, resulting in incorrect selections or production decisions.

In some implementations, content may be presented by client devices with interactive controls. For example, FIG. 1A is an illustration of an implementation of a media player 100 allowing user interaction. Media player 100 may be a stand-alone software application, embedded player within a web page rendered by a web browser, a display environment of a smart television, or any other type and form of interface for presenting content to a user and allowing the user to interact with the content or presentation of the content in at least a limited way.

Media player 100 may display content 102, such as multimedia content, audio content, text content, or any other type and form of content. In many implementations, content 102 may have a temporal aspect or duration, such as audio or video content. Examples of such content include live or pre-recorded television programming, movies, music, radio shows, podcasts, or any other such content. In many implementations, a media player 100 may represent the temporal aspect of the content 102 with a time line 104 or similar interface for displaying a playback time 106 and/or allowing interaction with playback (e.g. rewinding, fast forwarding, pausing, initiating playback at a particular time, etc.).

Different or additional content may be presented in sequence or at predetermined times during longer content, particularly for broadcast or streamed content, such as pre-roll content or advertising before another program; post-roll content or advertising after the program; or interstitial content or advertising during breaks in the program.

In many implementations of media players 100, a user may have the ability to terminate or skip over a portion of content, such as advertising content, or otherwise interact with or control presentation of the content. For example, pre-recorded content, such as advertising, typically has predetermined duration or maximum length 108, such as 30 seconds. In some implementations, a user may watch the full advertisement, or may elect to skip a portion of the advertisement by selecting a "skip" button 110 or similar interface element. Although shown over one corner of the displayed media content 102, in many implementations, a skip button 110 may be placed elsewhere within the media player 100 or separately from the media player (e.g. on a remote control). Selection of the skip button 110 may cause the media player 100 to terminate playback of the present content and request a next item of content or begin playback of a buffered next item of content. In other implementations, a "dislike" or "not relevant" button may be used to indicate that the user is not interested in the displayed content, and the media player 100 may provide an identification of the preference to a content selection system for adjustment of personalization profiles or to a content provider for market research purposes. In some such implementations, the media player may continue presentation of the media after selection of the "dislike" or "not relevant" interface element.

While "skip", "dislike", "not relevant" or similar negative interface elements may indicate that a user is not interested in the content, in other implementations, media player 100 may include positive interactive controls to allow a user to expressly indicate that the user is interested in the content. For example, media player 100 may include a control to trigger a request for a content-related website, purchase of a content-related item, or perform other such functions.

Selection of a negative or positive interface element may not only indicate an explicit preference of a user, the selection also implicitly identifies the user as being present and consuming or engaged with the content. However, in many instances, users may have a positive preference for, consume, or otherwise be engaged by the content, but may not select a corresponding interface element. For example, some media players 100 may not include positive interface elements, such that users may only either skip the media (indicating a negative preference) or watch the media fully. This latter behavior may indicate that the user has a positive preference for the media, or may indicate that the user left the room without stopping playback or became otherwise disengaged from the presentation.

Figure 1B:
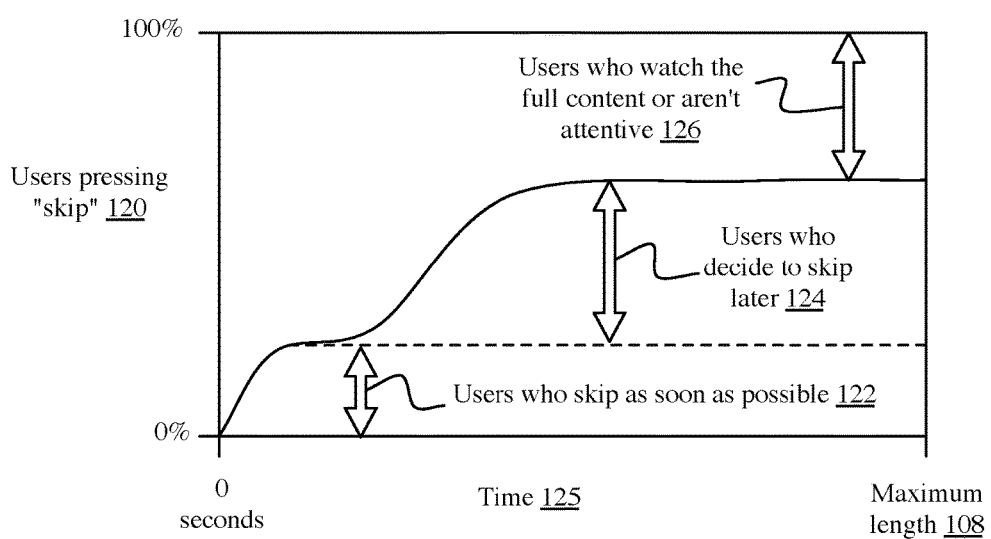
FIG. 1B is a graph illustrating an example of interactions with content over time, according to one implementation.

FIG. 1B is a graph illustrating an example of negative interactions 120 (e.g. selection of a "skip", "dislike", "not relevant" or similar interface element) with a presentation of content over time 125, according to one implementation. In many instances, a subset of users 122 may select a negative interface element as soon as possible (to avoid watching advertising, for example), and accordingly, an interaction or "skip" rate may initially rise quickly. Another subset of users 124 may watch the content and decide, at some point during presentation of the content, that they are not interested and may select the interface element. The skip rate may similarly rise during this time, albeit at different rates depending on how interesting the content is.

At some point during playback of the content, few users who are actively engaged by but are not interested in the content will remain or will not have selected the interface element, as most users 122 and 124 will have already done so. Accordingly, the skip rate may decline and eventually level off (e.g. very few users who intend to press a skip button will wait until the final seconds of an item of content). However, the remaining subset of users 126 (e.g. the total audience size or number of client devices receiving the content, minus the sum of subsets 122 and 124) represents both users that are actively engaged by and interested in the content, and users that are not engaged by (e.g. not present or distracted from) the presentation of the content.

To distinguish between users that are engaged and interested with content, and users that are not engaged with the content, user presence or attention may be estimated via comparison to high quality engagement data from small audience measurement panels, or extrapolated based on a temporal-engagement curve. An attention gap may be estimated, representing users that were not present for or not engaged with or paying attention to a presentation of content at a client device. This allows the measurement system to distinguish between users who consumed and potentially enjoyed the content, and users who did not, even as client devices of both sets of users receive and present the content items.

For purposes of reading the description of the various embodiments below, the following descriptions of the sections of the specification and their respective contents may be helpful:

Section A describes a network environment and computing environment for delivering content and estimating audience attention rates;

Section B describes embodiments of systems and methods for estimating audience attention via comparison to engagement data from panels; and Section C describes embodiments of systems and methods for estimating audience attention via temporal engagement extrapolation.

A. Network and Computing Environment

Figure 2A:
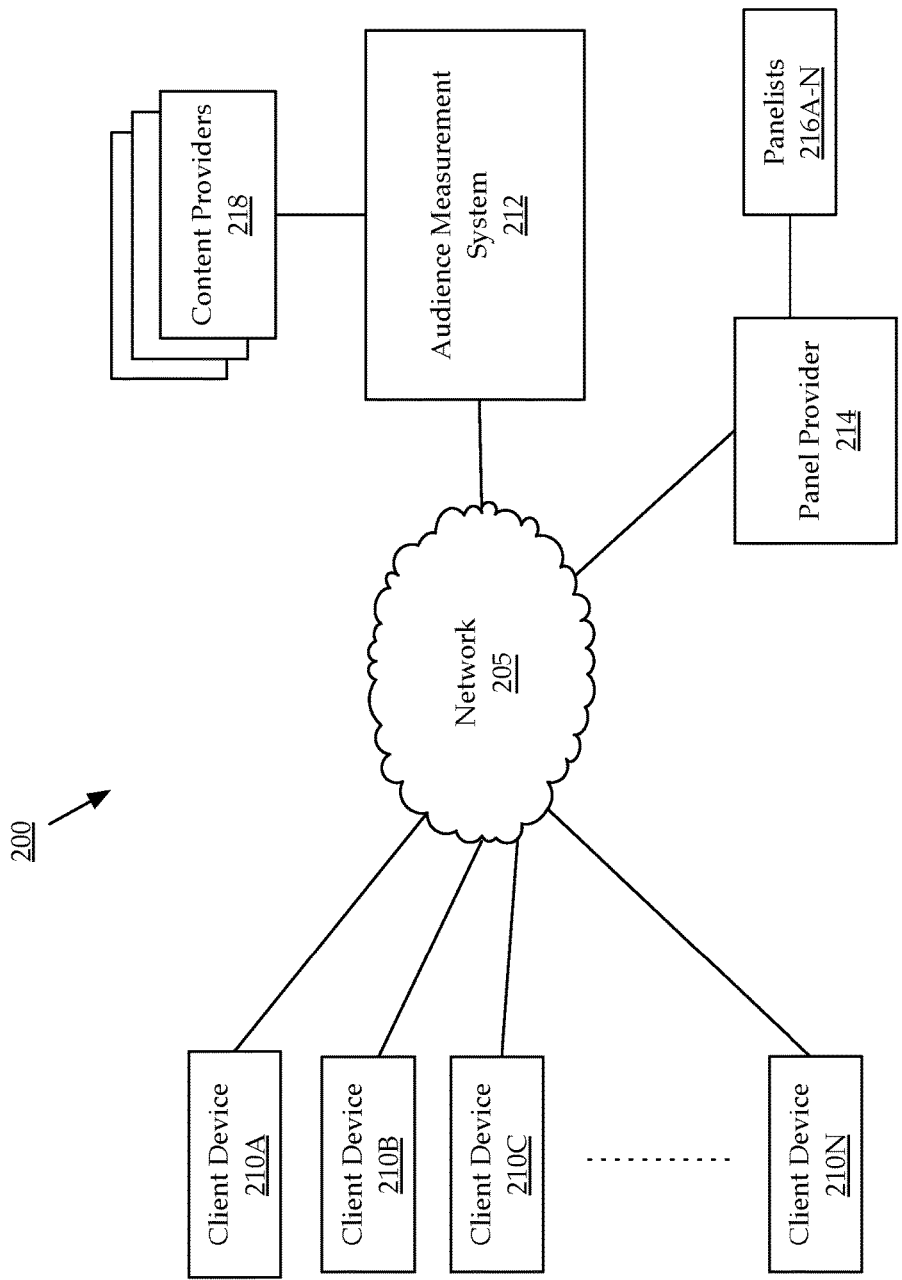
FIG. 2A is a block diagram of a content delivery and engagement measurement environment, according to one implementation.

FIG. 2A is a block diagram of a content delivery and engagement measurement environment 200, according to one implementation. A network 205 may connect one or more client devices 210A-210N (referred to generally as client device(s) 210); and a content distribution system or audience measurement system, referred to generally as an audience measurement system 212. The audience measurement system 212 may receive content from one or more content providers 218, either directly or via a network 205. The audience measurement system 212 may also communicate with a panel provider 214, which may perform single-source panel measurements or market research with one or more panelists 216A-216N (referred to generally as panelist(s) 216). Although only one measurement system or server 212 and one panel provider 214 are illustrated, in many implementations, a plurality of providers or servers may communicate via one or more networks 205.

Still referring to FIG. 2A and in more detail, network 205 may be any form of computer network or combinations of networks that relay information between client devices 210, one or more audience measurement servers 212, as well as other devices not illustrated. Network 205 may include the Internet and/or other types of data networks, such as a local area network (LAN), a wide area network (WAN), a cellular network, satellite network, or other types of data networks. Network 126 may also include any number of computing devices (e.g., computer, servers, routers, network switches, etc.) that are configured to receive and/or transmit data within network 205. Network 205 may further include any number of hardwired and/or wireless connections. A client device 210 may communicate wirelessly (e.g., via WiFi, cellular, radio, etc.) with a transceiver that is hardwired (e.g., via a fiber optic cable, a CAT5 cable, etc.) to other computing devices in network 205. In some implementations, a network 205 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

Client device(s) 210 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 205. In some implementations, a client device 210 may execute an application, service, server, daemon, routine, or other executable logic for communicating over a network 205, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 205, such as an Ethernet or WiFi interface. In other implementations, client device 210 may receive content via network 205 and may transmit identifications of interactions via network 205.

A content provider 218 may include one or more computing devices connected to network 205 and configured for providing content to a client 210, either directly or via an audience measurement system or content distribution system 212. Content provider 218 may be referred to variously as a content provider, server, web server, data server, publisher, service provider, or by other similar terms. In many implementations, content provider 218 may include a plurality of computing devices configured as a server farm or cloud, and may include routers, load balancers, network address translators, firewalls, or other such devices. Content providers 218 may be computer servers (e.g., FTP servers, file sharing servers, web servers, etc.) or combinations of servers (e.g., data centers, cloud computing platforms, etc.). Content providers 218 may provide any type and form of content, including text, images, video, audio, multimedia, or other data, or any combination of these. Content may include search results, blog or forum content, news articles, movies, television shows, podcasts, video games or other interactive content, advertising in any format, web sites, social media, or any other type and form of content. Content provider 218 may be an online search engine that provides search result data to client device 210 in response to a search query. In another implementation, content provider 218 may be a first-party web server that provides webpage data to client device 210 in response to a request for the webpage.

An audience measurement server or system 212 may include one or more computing devices connected to network 205 and configured for measuring and analyzing audience data to determine audience size and engagement rate. Audience measurement server 212 may be referred to variously as a content distribution system, distribution and measurement system, measurement server, server, web server, data server, service provider, or by other similar terms. In many implementations, an audience measurement server 212 may include a plurality of computing devices configured as a server farm or cloud, and may include routers, load balancers, network address translators, firewalls, or other such devices. In some implementations, an audience measurement server 212 may be a content provider 218.

In some implementations, an audience measurement server 212 may receive identifications of requests for content and/or device identifiers from a client 210 via network 205. In one such implementation, a client 210 may execute a plug-in or other application to transmit identifications of requests for content to an audience measurement server 212. In another implementation, a request for content may be transmitted from client 210 to audience measurement server 212, which may then redirect the request to an appropriate content provider 218, while recording information about the request. In still another implementation, a request for content may be transmitted from client 210 to a content provider 218, which may respond with the content and embedded instructions causing the client 210 to transmit a second request to the audience measurement server 212. Content delivered from a content provider, such as a web page, may include an embedded one pixel by one pixel image with an address of the audience measurement server 212, such that when a web browser of the client renders the content, the web browser transmits a request for the image to the audience measurement server 212, potentially including parameters or cookies, device identifiers, or other information.

In other implementations, an audience measurement server 212 may receive identifications of requests for content and/or device identifiers from a content provider 218. A content provider 218 may execute a measurement agent (not illustrated), which may comprise an application, service, server, daemon, or other executable logic for measuring requests from client devices received by the content provider 218. The measurement agent may transmit identifications of the requests to an audience measurement server 212, either individually or aggregated.

A panel provider 214 may comprise one or more computing devices for performing market or audience research with one or more panel participants or panelists 216. Panel participants who have agreed to participate in the panel may indicate to the panel provider that they watched or listened to a particular item of content, such as a television show; a radio program; a movie; a commercial break; an identified time period such as a minute, ten minutes, half hour, or any other such time period; or any other such information. In some implementations, a panel participant may provide a diary or log, or wear or carry a portable device that detects content played back in the vicinity and records a log for subsequent transmission to the panel provider. Panel providers 214 may aggregate and anonymize demographic information about each panel participant that watched or listened to the event to create an audience profile, indicating traits such as percentage of the audience that is a specified gender, age, from a particular location, or other such information. Measurement of the audience of the content may be useful for measuring audience size or popularity of content for pricing and selling advertisement placements, planning content delivery schedules, or other such purposes.

In some implementations, panel providers 214 may aggregate and/or anonymize panel diaries or logs and transmit demographic information for a block of content to an audience measurement server 212. In many implementations, the panel provider 214 may transmit an identification of the corresponding broadcast block and/or information about the blocks of content to the audience measurement server 212, such as a program type, program title, program description, program-associated keywords, websites or other documents associated with the program, products and/or manufacturers associated with the program, or any other such information.

In some implementations, panel providers 214 may collect preference information from panelists 216 for an item of content, such as a positive or negative preference for the content. In some implementations, this may be an explicit identification of preference, while in other implementations, panelists 216 may be allowed to select to skip items of content, indicating a negative preference. In some such implementations, panelists may use client devices 210 and media players 100 as discussed above.

Because panel providers typically pay panel members for participation, panelists 216 may be fully engaged with content. Accordingly, such audience measurement and preference data may be of high quality, albeit for a small sample size.

In many implementations, demographic information about panelists (and other users) may be anonymized or disambiguated to protect the privacy of the panelist or device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Figure 2B:
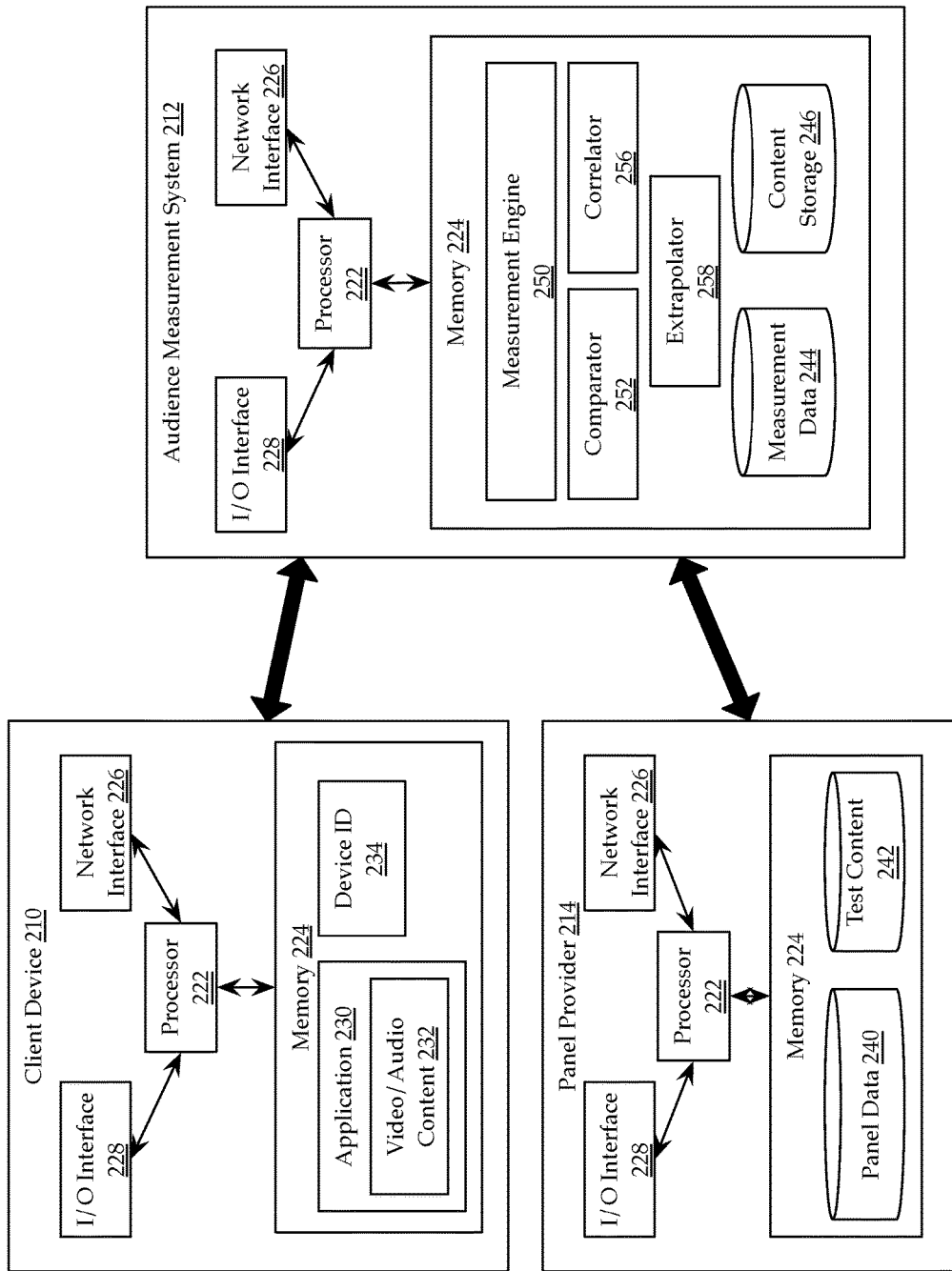
FIG. 2B is a block diagram of client and server devices shown in FIG. 2A, according to one implementation.

FIG. 2B is a block diagram of client and server devices shown in FIG. 2A, according to one implementation. Referring first to client device 210, a client device may be a computing device of a client, panel participant, or non-panel participant or "regular" audience member for content. Client device 210 may be any number of different types of user electronic devices configured to communicate via network 205, including without limitation, a laptop computer, a desktop computer, a tablet computer, a smartphone, a digital video recorder, a set-top box for a television, a video game console, or any other type and form of computing device or combinations of devices. In some implementations, the type of client device 210 may be categorized as a mobile device, a desktop device or a device intended to remain stationary or configured to primarily access network 205 via a local area network, or another category of electronic devices such as a media consumption device.

In many implementations, client device 210 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C#, Java, JavaScript, Perl, HTML, XML, Python and Visual Basic.

Client device 210 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, client device 210 may include a plurality of network interfaces 226 of different types, allowing for connections to a variety of networks 205 or a network 205 such as the Internet via different sub-networks. Client device 210 may also include other interfaces for receiving terrestrial, satellite, or cable analog or digital broadcasts, as discussed above.

Client device 210 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 210, such as a built-in display, touch screen, microphone, etc., or external to the housing of client device 210, such as a monitor connected to client device 210, a speaker connected to client device 210, etc., according to various implementations.

Client device 210 may include in memory 224 an application 230 or may execute an application 230 with a processor 222. Application 230 may be an application, applet, script, service, daemon, routine, or other executable logic for receiving content and for transmitting responses, commands, or other data. In one implementation, application 230 may be a web browser, while in another implementation, application 230 may be a video game. Application 230 may include functionality for displaying content received via network interface 226 and/or generated locally by processor 222, and for transmitting interactions received via a user interface device 228, such as requests for websites, selections of survey response options, input text strings, etc.

Application 230 may be a media player or include an embedded media player 100, such as a plug-in or native media player within a web browser. Application 230 may provide user interfaces for interacting with content played in the media player, such as a skip control, dislike button, or any similar interface.

In some implementations, application 230 may include a data collector or collection agent. A collection agent may include an application plug-in, application extension, subroutine, browser toolbar, daemon, or other executable logic for collecting data processed by application 230. In other implementations, a collection agent may be a separate application, service, daemon, routine, or other executable logic separate from application 230 but configured for intercepting and/or collecting data processed by application 230, such as a screen scraper, packet interceptor, API hooking process, or other such application. A collection agent may be configured for intercepting or receiving data input via user interface device 228, such as Internet search queries, text strings, survey response selections, or other values, or data received and processed by application 230 including websites visited, time spent interacting with a website or application, pages read, or other such data. In many implementations, a collection may store some or all of this data or identifiers of such data in a behavior history database or other data structure, and may include identifications of websites visited, web links followed, search queries entered, or other such data. In some implementations, the data may be anonymized or disambiguated to reduce personally identifiable information. In other implementations, the collection agent may be executed by a server, or by an intermediary device deployed between the client and server, such as a router, cable modem, or other such device. Data requests and responses may be parsed by a collection agent executing on an intermediary router as the requests and responses traverse the router. In some implementations, this may allow for monitoring of all data flow to/from a household, without requiring installation of the collection agent on a plurality of devices within the household. In other implementations, as discussed above, a client device 210 may not execute a collection agent; in such implementations, request data may be obtained by an audience measurement server without the use of a collection agent, such as via embedded images in rendered content, redirected requests, or other such methods.

Client 210 may include or be identified with a device identifier 234. Device identifier 234 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 234 may be fixed to the device or preconfigured in the device, such as a manufacturer serial number or MAC address, while in other implementations, the device identifier 234 may be dynamically set by a content provider, panel provider, audience measurement server, application 230, or other entity, such as a cookie or username. In some implementations, a unique or new device identifier 234 may be set for each communication to a content provider and/or audience measurement server, while in other implementations, the device identifier 234 may not be changed, or may be changed periodically (e.g. hourly, daily, weekly, etc.) or at other intervals (e.g. on restart of the client device, login to an internet service, etc.). In some implementations, a device identifier 234 may be associated with one or more other device identifiers 234 (e.g., a device identifier for a mobile device, a device identifier for a home computer, etc.). In many implementations, as discussed above, a device identifier 234 may be generated and/or transmitted to the device 210 by a content provider. In other implementations, as discussed above, client 210 may request a device identifier or cookie 234 from an audience measurement server or content provider, and may transmit the device identifier or cookie 234 to the audience measurement server provider or content provider in association with requests for content.

Also illustrated in FIG. 2B is a block diagram of an implementation of an audience measurement server 212 or content provider 218, broadcast provider, or similar device. As with client devices 210, server 212 may include one or more processors 222, memories 224, network interfaces 226, and user interfaces 228. In some implementations referred to as headless servers, a server 218 may not include a user interface 228, but may communicate with clients 210 with user interfaces 228 via a network 205. Memory 224 may include content storage, such as storage of webpages, images, audio files, video files, data files, or any other type and form of data. In some implementations, memory 224 may store one or more applications (not illustrated) for execution by processor 222 of the server, including FTP servers, web servers, mail servers, file sharing servers, peer to peer servers, or other such applications for delivering content stored in content storage.

In some implementations, a server 212 may execute a measurement engine 250. Measurement engine 250 may comprise an application, service, server, daemon, routine, or other executable logic for measuring an audience of an item of content, including receiving device identifiers and/or requests for items of content or information about such requests, aggregating or sorting content identifiers according to a device identifier, and measuring an audience for an item of content during a time period. In one implementation, measurement engine may count the number of content identifiers identifying a particular item of content received over a period of time, such as an hour, associated with distinct device identifiers, to count a size of an audience that received the item of content. This audience measurement may be provided to content providers, advertising providers, marketers, publishers, analysts, or others.

In some implementations, a server 212 may maintain a measurement database 244. A measurement database 244 may comprise any type and form of database, flat file, data file, data array, or other data structure, for storing a plurality of content identifiers with corresponding device identifiers, cookies, and/or session identifiers. In many implementations, a measurement database 244 may also include a timestamp of received or transmitted content identifiers. Measurement database 244 may also include demographic information or characteristics received from a client device, either in connection with a request for content or previously received from the client device and associated with the device identifier. Characteristics may be explicitly obtained, via surveys or profile questions, or may be implicitly obtained, via requests associated with the device being similar to requests associated with a device having known characteristics. Characteristics or traits may be identified with values, such as where a characteristic may have several different potential values. In some implementations, characteristics associated with a broadcast event or block from different devices may be aggregated and/or anonymized.

Server 212 may also maintain content storage 246, which may store any type and form of content including audio or video content as discussed above. In some implementations, content storage 246 may be in one or more external storage devices, or may be distributed across one or more servers 212 or cloud storage devices. Content from content storage 246 may be provided to client devices 210, panel providers 214, or panelists 216.

Server 212 may execute a comparator or comparison engine 252. Comparator 252 may comprise an application, service, server, daemon, routine, or other executable logic for comparing measurement data, such as measured skip rates for content provided to an audience, skip rates from panelist measurements, or other such information. Comparator 252 may comprise a bitwise comparator for comparing integer values or bit strings, a mathematical comparator, an analog comparator, or any other type and form of hardware or software for comparing values to each other and/or to thresholds.

Server 212 may also execute a correlator or correlation engine 256, which may comprise an application, service, routine, daemon, or other executable logic for determining a correlation between various information, including multivariate demographic data. Correlator 256 may use any type and form of algorithm to determine a correlation between a statistical value for presence of a characteristic in aggregated device measurement data and presence of the characteristic in demographic data. Correlation engine 256 may use a Pearson correlation algorithm to compare a frequency of a characteristic in data with a frequency of the characteristic in other data. The resulting correlation coefficient may be compared to a threshold, and a confidence score associated with the characteristic may be increased or decreased responsive to the coefficient being above or below a threshold.

Server 212 may also execute an extrapolator 258, which may comprise an application, service, routine, daemon, or other executable logic for extrapolating a predicted value for a given input parameter from a data set. Extrapolator 258 may use any type and form of algorithm to determine an extrapolation, including determining a best fit curve, calculating a limit of a given function, or any other such functions.

Also illustrated in FIG. 2B is a block diagram of an implementation of an server of a panelist provider 214. As with client devices 210, server 214 may include one or more processors 222, memories or storage devices 224, network interfaces 226, and user interfaces 228. In some implementations referred to as headless servers, a server 214 may not include a user interface 228, but may communicate with clients 210 or panelists 216 with user interfaces 228 via a network 205. Memory 224 may include content storage, such as storage of webpages, images, audio files, video files, data files, or any other type and form of data. In some implementations, memory 224 may store one or more applications (not illustrated) for execution by processor 222 of the server, including FTP servers, web servers, mail servers, file sharing servers, peer to peer servers, or other such applications for delivering content stored in content storage.

In some implementations, panel provider 214 may maintain a database 240 of panel information. Database 240 may be any type and form of database, and may include information about panelists including demographic information, content preferences, or any other such information. As discussed above, in many implementations, panelist information may be obfuscated, encrypted, anonymized, or otherwise made ambiguous to protect privacy of panelists.

Panel provider 214 may store test content 242, which may comprise any type and form of content for presentation to panelists 216. In some implementations, test content 242 may be a subset of content from content storage 246. For example, as discussed in more detail below, test content 242 may be content that is widely preferred or disliked by panelists or audience members, as opposed to content for which audience members may be more ambivalent. Panel provider 214 may store information about the test content, including skip rates, preference rates, or other such information. In many implementations, rather than storing test content 242, panel provider 214 may merely store an identification of test content (e.g. in a database), and may direct clients or panelists to content storage 246 maintained by server 212.

B. Engagement Estimation Via Panel Measurements

In one aspect, an audience measurement system can use content with known interest rates that may be determined at a high quality via small panels or marketing surveys. As discussed above, because the panelists may be paid for participation, engagement of the panelists with the content may be equal to 100% (with the panelists either liking or disliking the content, but nonetheless actively consuming the content, rather than being distracted or absent during presentation). Preferences may be determined either explicitly (e.g. "like" or "dislike" interface elements, or other such controls) or implicitly (e.g. by allowing panelists to skip or terminate presentation of content they dislike).

Figure 3A:
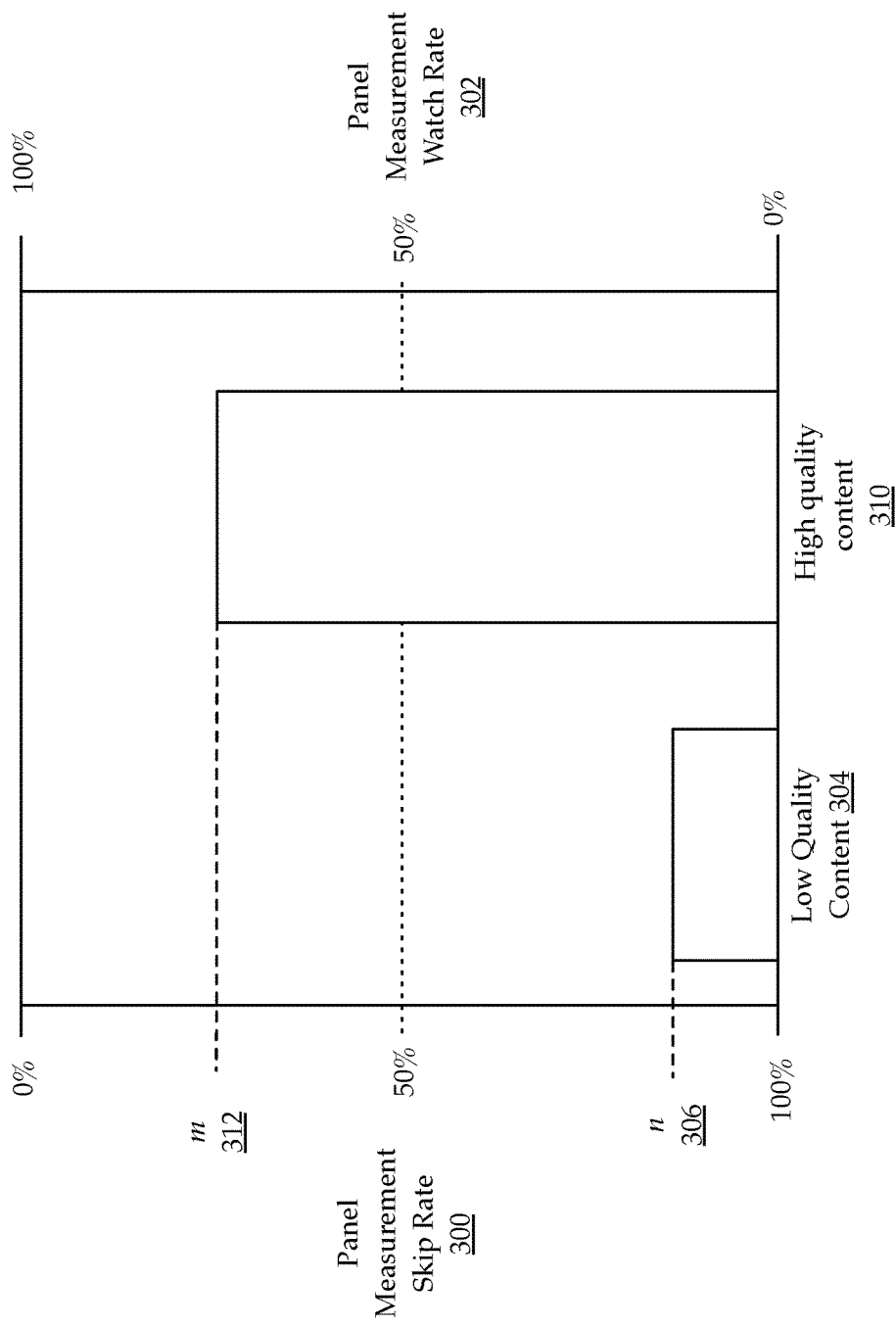
FIG. 3A is a graph illustrating an example of measurement of panel interactions with content, according to one implementation.

FIG. 3A is a graph illustrating an example of measurement of panel interactions ("dislikes" or "skips" rate 300; or inversely, "likes" or "fully watched" rate 302) with content, according to one implementation. Test content may be referred to as low quality content 304, which most of the panelists may dislike, or high quality content 310, which most of the panelists may like. Content that panelists are ambivalent towards (or content for which similar numbers of panelists like and dislike the content) may be discarded as too ambiguous for engagement testing purposes. Content may be explicitly designed to be high or low quality (e.g. 30 seconds of a siren sound and/or flashing lights), or may be selected responsive to large audience rates of skipping (e.g. low quality content) or not skipping (e.g. high quality content) of the content.

As shown, panelists may skip low quality content 304 at a very high level n 306 (equivalent to a very low level watch rate). In some instances, n may equal 100% for truly awful content; frequently, however, at least a few panelists may not dislike or skip the content, resulting in an n 306 of less than 100%. Similarly, panelists may skip high quality content 310 at a very low rate m 312 (equivalent to a very high watch rate). Likewise, while it's possible that no panelists would skip some very high quality content, in many instances, at least a few panelists skip the content, resulting in low, but non-zero rates m 312. Low and high quality content may be classified as such based on thresholds, which may be set far enough apart to avoid ambiguity or measurement error. In various implementations, low quality content may have skip rates greater than 70%, 80%, or 90%, or any other such value; and high quality content may have skip rates less than 30%, 20%, or 10%, or any other such value. More extreme values may result in measurement improvements.

The same test content may be subsequently presented to a general audience, with audience engagement measured via interactions with the content (e.g. click-throughs, skips, survey selections, etc.). As discussed above, an audience interaction rate measured using skips, for example, may directly identify a percentage of users who are actively engaged, but not interested in the content (e.g. who explicitly skip over the content); but may over-represent users who consume and enjoy the content without skipping the content by including in this number users who are not present or not engaged with the content. An attention gap may be identified as a difference between the known interest rate and the measured interaction rate. Under an assumption that if all users were engaged with the content, the audience interaction rate would be similar to the interaction rate for the panelists, the attention gap thus represents the portion of users who are not engaged with or present for the presentation of content. The percentage of engaged and interested users may thus be determined, and content providers charged per active view or selection algorithms adjusted. The same attention gap may be used to estimate engagement for prior or subsequent presentations of content.

Figure 3B:
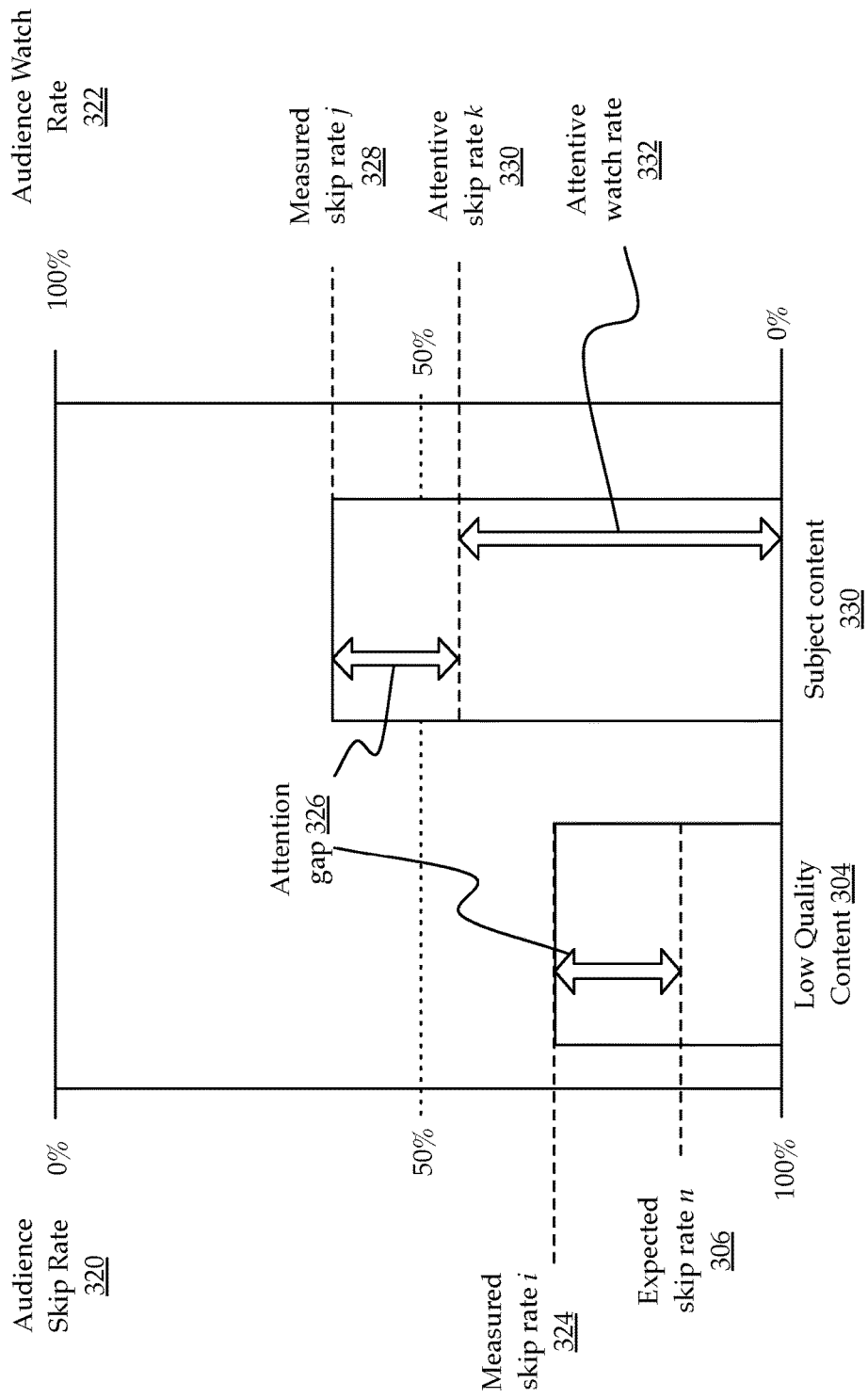
FIGS. 3B and 3C are graphs illustrating estimation of audience engagement using gaps between measured and expected content interactions, according to some implementations.

FIG. 3B is a graph illustrating estimation of audience engagement using gaps between measured and expected content interactions for low quality content 304, according to some implementations. An expected skip rate n 306 may be determined as discussed above in connection with FIG. 3A based on fully-engaged panelist interactions with the content. The same content may be provided to a general audience with the ability to dislike or skip the content. As some number of the general audience will likely be disengaged (e.g. distracted or not present) during presentation of the content, a smaller percentage of the general audience will explicitly dislike or skip the content, resulting in a measured skip rate i 324 less than expected skip rate n (or inversely, a watched rate greater than an expected watched rate). The difference between the expected rate n and measured rate m represents an attention gap 326, or percentage of users that were disengaged and would likely have skipped the content, had they been present.

Other content, referred to as subject content 330, may be provided to the same audience client devices before or after the test content 304 (e.g. either immediately before or after, or within a short time frame during which any user disengaged from the test content is likely to be similarly disengaged from the subject content 330, such as during a commercial break). A skip rate j 328 may be measured for the audience client devices (or, inversely, a watch rate). The attention gap 326 may be added to the skip rate (or subtracted from the watch rate) to calculate an attentive skip rate k 330 (or attentive watch rate 332). The attentive skip rate or watch rate indicates the percentage of audience members that would have skipped or fully watched the content, respectively, had those disengaged or not present users been present and able to elect to skip the content.

Figure 3C:
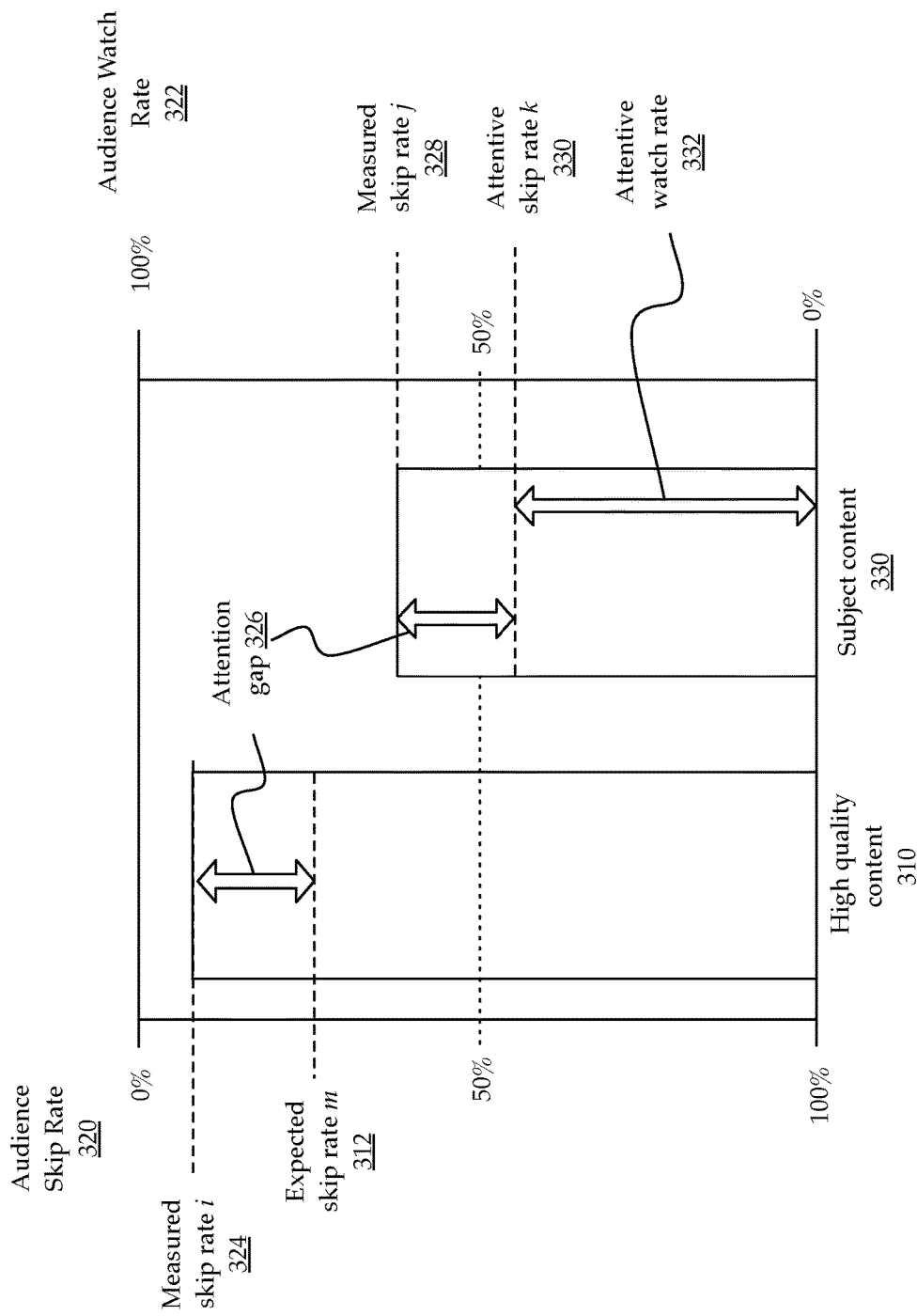

FIG. 3C is another graph illustrating estimation of audience engagement using gaps between measured and expected content interactions for high quality content 310, according to some implementations. Similar to the graph shown in FIG. 3B, a measured skip rate i 324 may be lower than an expected skip rate m 312, with the difference equal to an attention gap 326. The attention gap 326 may be applied as discussed above to determine an attentive skip rate or attentive watch rate for other subject content.

Figure 4:
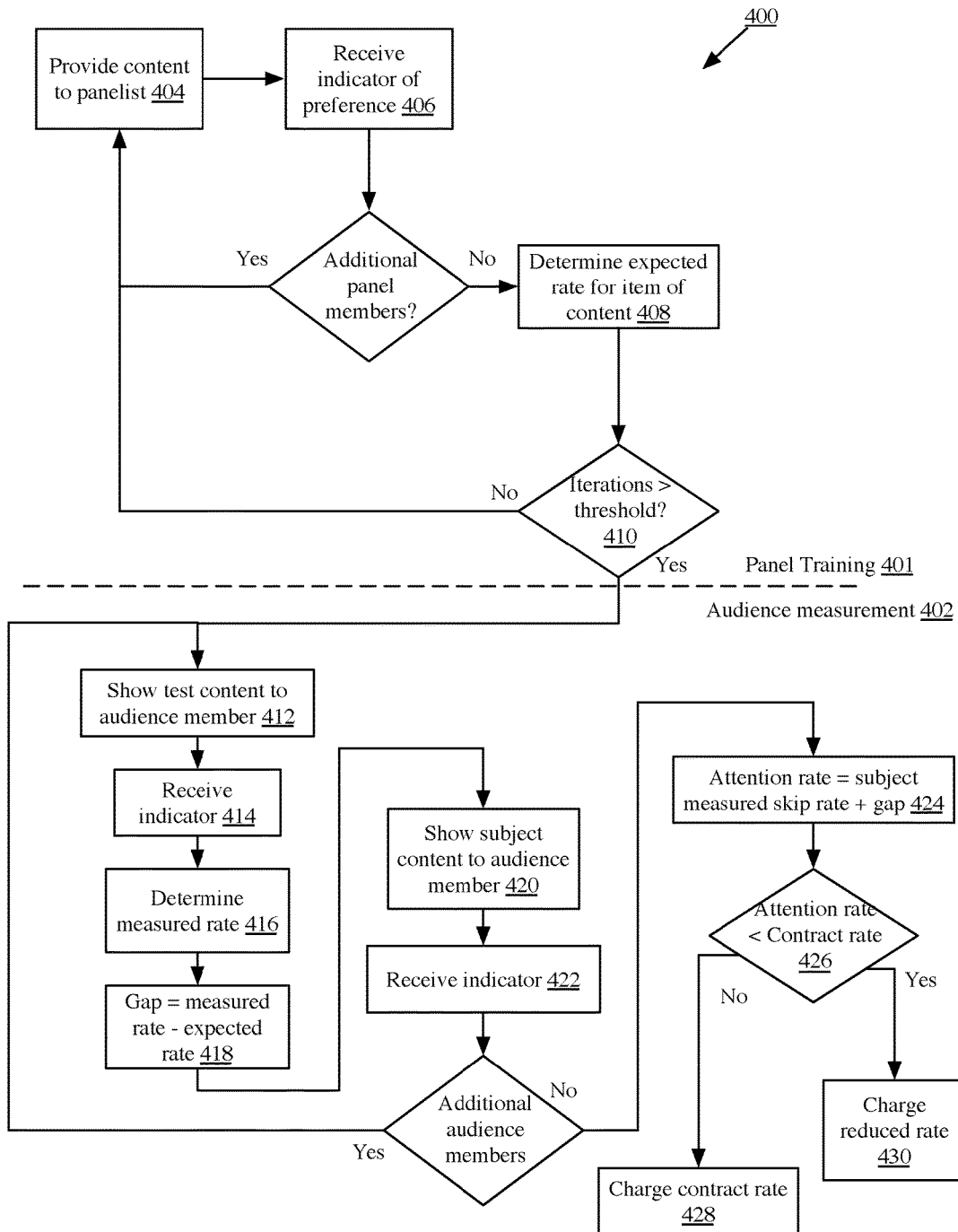
FIG. 4 is a flow chart of an implementation of a method for estimating user attention.

FIG. 4 is a flow chart of an implementation of a method 400 for estimating user attention. The method is divided into two stages, panel training 401 or training of the attention gap model based on panelist measurements for content; and audience measurement 402, or application of the model. Although shown with training 401 performed before measurement 402, in some implementations, training 401 may be performed after and attention estimations made on stored data from earlier audience measurements.

During panelist training of the model, at step 404, an item of content may be shown or provided to a panelist. In some implementations, the content may be provided to the panel as a group (e.g. in a group setting), while in other implementations, the content may be provided to individual client devices of panel members. In such implementations, the content may be provided via a media player, as discussed above in connection with FIG. 1A. Each panel member may consume the content and indicate a positive or negative preference for the content, or may watch the content (indicating a positive preference) or elect to skip or terminate presentation of the content (indicating a negative preference). As discussed above, each interaction may trigger the media player, collection agent, or similar application to transmit a request or identifier to a panel provider for measurement purposes.

At step 406, the request or identifier may be received by the panel provider. The identifier of the panelist's preference may be stored, such as in a panel information database. In some implementations, a skip or watch rate for the item of content may be updated based on the referenced preference. In one such implementation, for a skip rate equal to number of skip interactions received divided by a number of panelists, the panelist number may be incremented and the number of skip interactions either incremented responsive to receipt of a skip indicator or not incremented, responsive to receipt of a watched or positive preference indicator (or indicator of the content being provided to the panelist and no negative preference indicator being received). A watch rate may be similarly updated in other implementations. In many implementations, steps 404 and 406 may be repeated iteratively for each member of the panel, or until the number of participating panelists exceeds a predetermined threshold for sufficient statistical accuracy of the panel (such a threshold may be based on a number of panelists equal to a predetermined fraction of a corresponding audience or demographic population).

If data from additional panel members is not needed, then at step 408, the panel provider or an audience measurement system may determine an expected rate for the item of content, equal to either the aggregated skip or watch rate, depending on implementation. The expected rate may be provided to the audience measurement system, or stored in measurement data associated with the item of content.

As discussed above, the item of content may be predetermined or created to be a low or high quality item of content, or may be classified as low or high quality responsive respectively to the aggregated skip or watch rate from the panel being above a predetermined threshold.

Larger panels or repeat testing may improve accuracy of the expected rate. Accordingly, in some implementations, at step 410, the panel provider or audience measurement system may compare a counter of iterations of steps 404-408 to a threshold, and may repeat steps 404-410 responsive to the number of iterations being below the threshold.

During the audience measurement phase 402, at 412, an item of test content (e.g. content shown to the panel, for which an expected rate is known) may be shown to an audience member or provided to a client device of an audience member or user as discussed above. In some implementations, the client device may request an item of content such as a subject item of content, and the content provider or distributor may select to provide both the item of test content and the subject item of content. In other implementations, the content provider or distributor may select to provide the test content responsive to a first request, and select to provide the subject content responsive to a second request.

At step 414, the audience measurement server may receive an indicator from the client device, such as a skip or negative preference indicator. The indicator may be received via any method or system discussed above, such as via a parameter of a request (e.g. an HTTP request for an small image or a GET request with a parameter and/or corresponding value) or any other such method.

At step 416, the audience measurement server may determine a measured skip rate (or inversely, a watch rate) for the presentation of the test content to the non-panel audience. As discussed above, the rate may be determined or updated from a previous rate for the content, as a number of received skip indicators divided by a number of requests for the content or transmissions of the content (or, for a watch rate, the inverse of this value). As shown, in many implementations, steps 412-422 may be repeated for additional audience members, and the measured rate may be correspondingly updated.

At step 418, an attention gap may be determined, the attention gap equal to the measured skip rate for the presentation of the test item of content to the non-panel audience minus the expected skip rate obtained from the panel for the test item of content (or the measured watch rate minus the expected watch rate).

At step 420, the subject content may be shown or presented to the audience member. As discussed above, the subject item of content may be provided to the audience member within a predetermined time window from the presentation of the test item of content, to ensure accuracy of the calculated attention gap. The subject item may be provided directly, or the client device of the audience member may request the subject item of content for display.

The client device may present the subject item of content, and the user may either interact with the content negatively, explicitly interact with the content positively, implicitly interact with the content positively (e.g. by watching the content in its entirety) or become disengaged from the item of content (e.g. be distracted, leave the room, etc.). If the user explicitly interacts with the content, then at step 422, the audience measurement server may receive an identification of the explicit indicator (e.g. skip, dislike, like, etc.). The explicit or implicit indicator may be recorded and aggregated with other indicators for the subject item of content, such as incrementing a number representing the size of the audience population and a number representing the number of skips or non-skips (e.g. for determining the skip rate or watch rate). As discussed above, in some implementations, steps 412-422 may be repeated for additional audience members. In a further implementation, steps 412-422 may be repeatedly performed iteratively before or after step 424 and/or steps 426-430. Thus, in some implementations, an attention rate may be recalculated for each presentation of the subject item of content; while in other implementations, an amount of measurement data may be collected and aggregated before an attention rate is determined.

At step 424, an attention rate for may be determined based on the measured skip rate for the subject item of content plus the calculated attention gap determined from the test item of content. The attention rate may represent a percentage of users who watched the content fully and were engaged with the content and not distracted or absent.

As discussed above, in some implementations, a rate charged to a provider of paid content (e.g. the subject item of content) by a content distributor may be adjusted based on the attention rate. Accordingly, at step 426, in some implementations, the measurement system may determine if the attention rate is less than a specified minimum attention rate in a contract or otherwise associated with the item of content. If not, then in some implementations, at step 428, the content provider may be charged the contract rate. If so, then at step 430, the contract rate may be reduced by a predetermined amount or a percentage corresponding to the attention gap. In other implementations, based on the attention rate, the content provider or distributor may select the subject item for wider distribution or may select other content that users may be interested in, based on the attention rate being above a predetermined threshold. For example, responsive to a high attention rate, a content distribution system may provide other content that is related to the subject content for automatic presentation, based on a high likelihood that the audience will remain engaged with the content.

Thus, by showing panel-tested and measured content with known skip rates for fully-engaged panelists to an audience with unknown levels of engagement, their attention rate may be determined by identification of gaps between expected skip rates and measured skip rates. This attention rate may be used to adjust measurements of skip rates or watch rates for other content, allowing the system to distinguish between users who consume content without skipping, and users who are distracted or not present during presentation of the content.

In one implementation, this disclosure describes a method of estimating user attention to content presented by a client device. The method includes transmitting, by an audience measurement system, to each of a plurality of client devices, a first content item. The method also includes receiving, by the audience measurement system, from each of a first subset of the plurality of client devices, a first skip indicator for the first content item, the first subset of the plurality of client devices smaller than the plurality of client devices. The method further includes determining, by the audience measurement system, a first skip rate for the first content item based on a ratio of a number of the first subset of the plurality of client devices to a number of the plurality of client devices. The method also includes transmitting, by the audience measurement system, to each of the plurality of client devices, a second content item, the second content item associated with a measured skip rate obtained from a panel study. The method also includes receiving, by the audience measurement system, from each of a second subset of the plurality of the client devices, a second skip indicator for the second content item, the second subset of the plurality of client devices smaller than the plurality of client devices. The method further includes determining, by the audience measurement system, a second skip rate for the second item based on a ratio of a number of the second subset of the plurality of client devices to the number of the plurality of client devices. The method also includes determining, by the audience measurement system, a rate difference between the second skip rate and the measured skip rate. The method also includes calculating, by the audience measurement system, an attention rate for the first content item based on the rate difference and the first skip rate, the attention rate indicating that a plurality of users is viewing the first video content item on the corresponding client device; and adding, by the audience measurement system, an entry to a database maintained by the audience measurement system, the entry identifying the first content item and the corresponding attention rate.

In some implementations, the method includes identifying, by the audience measurement system, a first subset of a population of client devices sharing a common characteristic; and selecting, by the audience measurement system, a plurality of devices corresponding to the first subset. For example, the plurality of devices may comprise devices of users sharing a common demographic or interest characteristic with a group of panelists.

In other implementations, the method includes transmitting, by the audience measurement system, to each of the plurality of client devices, a third content item, the third content item associated with a second measured skip rate obtained from a second panel study, the second measured skip rate lower than the measured skip rate. The method also includes receiving, by the audience measurement system, from each of a third subset of the plurality of the client devices, a third skip indicator for the third content item, the third subset of the plurality of client devices smaller than the plurality of client devices. The method further includes determining, by the audience measurement system, a third skip rate for the second item based on a number of the second subset of the plurality of client devices divided by the number of the plurality of client devices. The method also includes determining, by the audience measurement system, a second rate difference between the third skip rate and the second measured skip rate. In some such implementations calculating the attention rate includes calculating the attention rate based on the second rate difference. In a further implementation, the method includes calculating the attention rate by adding a first difference between the first skip rate and the difference and a second difference between the first skip rate and the second difference.

In some implementations, the method includes determining that a device type of the plurality of client devices is a mobile device; and reducing the attention rate by an adjusted rate based on determining that the device type is the mobile device. For example, in some such implementations, the system may assume that users of mobile devices are more easily disengaged than individuals consuming content on a smart television, for instance. Such device type-specific modifiers may be applied to the attention rate calculation.

In some implementations, the method includes determining, by the audience measurement system, that the first content item was automatically played; and calculating the attention rate based on determining that the first content item was automatically played. For example, some systems queue additional content for presentation automatically, even if the user has left the room. The measurement system may determine whether presentation of an item of content was manually requested or automatically requested, and may reduce an attention rate calculate by a predetermined amount or factor responsive to a determination that the content was automatically requested. In other implementations, the method includes determining, by the audience measurement system, that the first content item is a pre-roll content item or an interstitial content item associated with primary content; and calculating the attention rate based on determining that the first content item is the pre-roll content item or the interstitial content item.

In some implementations, the method includes generating, by the audience measurement system, an attention rate report for the first content item based on the attention rate retrieved from the database. The method also includes determining, by the audience measurement system, that the attention rate for the first content item is greater than a threshold attention rate; and transmitting, by the audience measurement system, to each of a second plurality of client devices, the first content item, responsive to determining that the attention rate is greater than the threshold attention rate.

In some implementations, the method includes generating, by the audience measurement system, based on the attention rate, an invoice for a content provider associated with the first content item; and transmitting, by the audience measurement system, to the content provider, the invoice for the first content item. In a further implementation, the method includes calculating, by the audience measurement system, a discount to a per-presentation rate on the invoice for the content provider based on the attention rate.

C. Engagement Estimation Via Temporal Engagement Extrapolation

In another aspect, the audience measurement system can utilize a temporal engagement curve based on similar or identical content of different durations. This allows engagement or attention measurement without requiring the use of a panel to determine a baseline or expected rate for an item of test content.

Figure 5A:
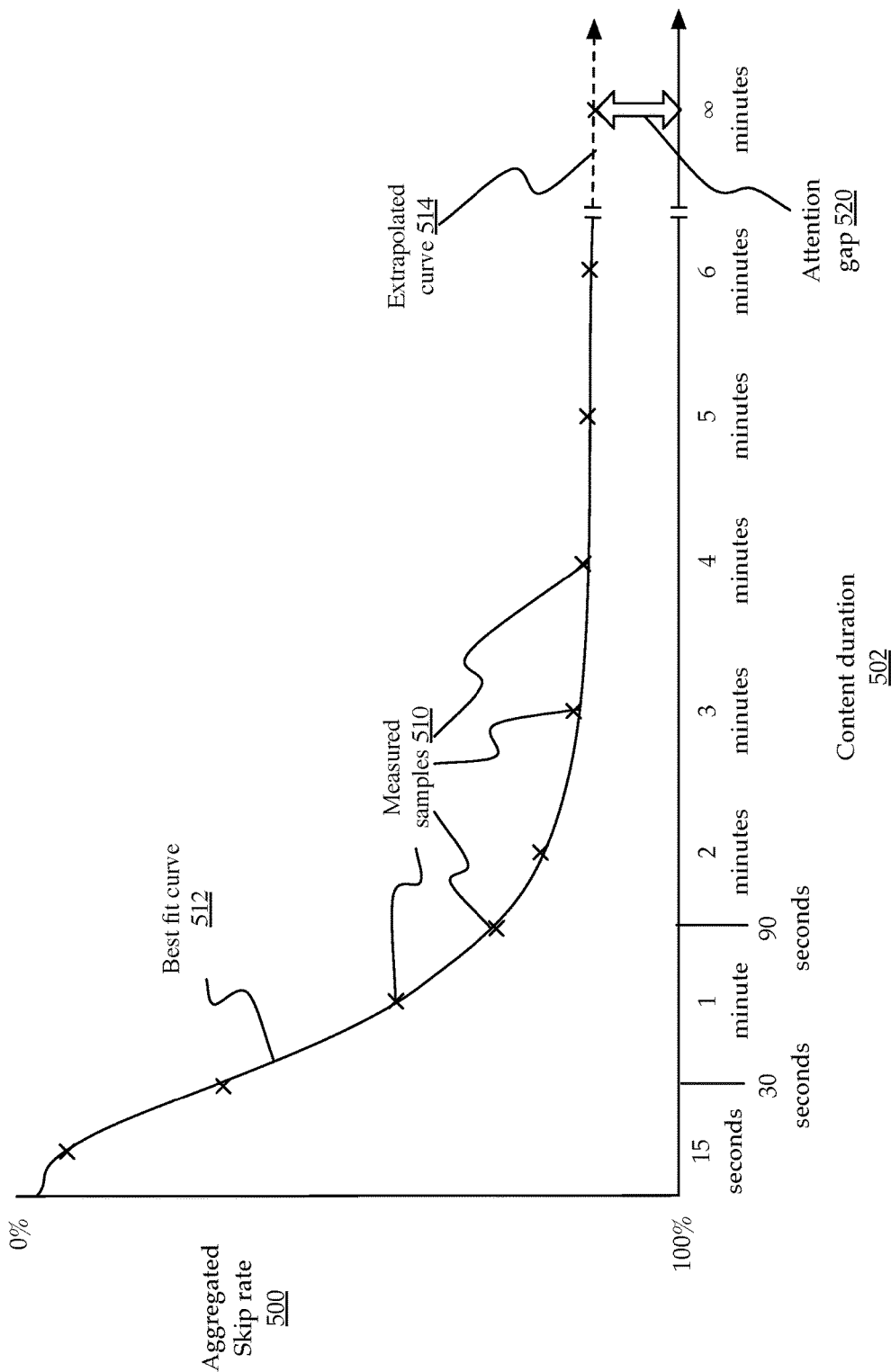
FIGS. 5A and 5B are graphs illustrating estimation of audience engagement using temporal engagement extrapolation, according to one implementation.
Figure 5B:
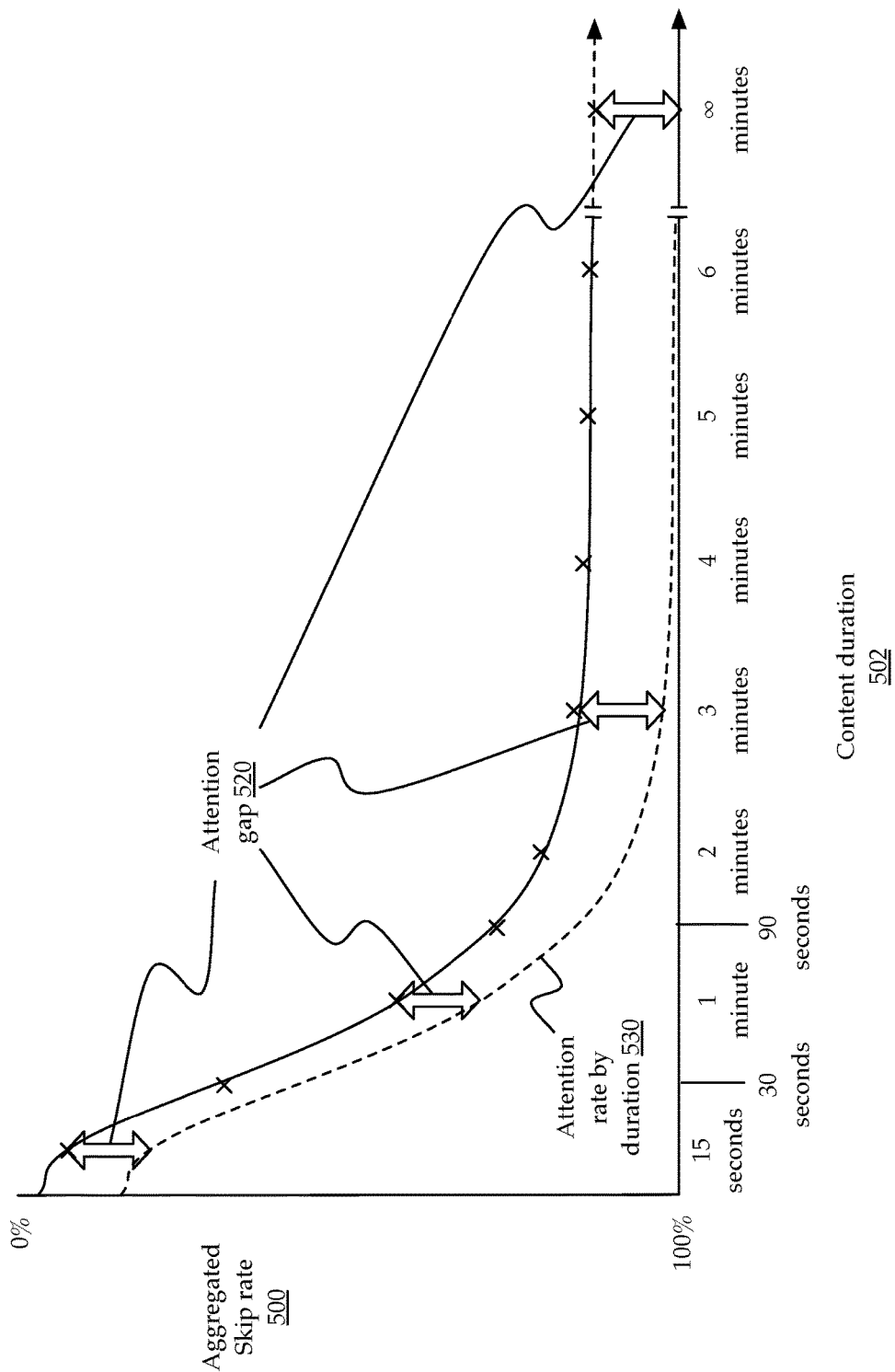

FIGS. 5A and 5B are graphs illustrating estimation of audience engagement using temporal engagement extrapolation, according to one implementation. Referring first to FIG. 5A, the graph shows an aggregated skip rate 500 for one or more audience members over content duration 502 for items of related content. Content may be related but of different durations, such as 15 second commercials and 30 second commercials in the same advertising campaign. In another implementation, shorter content may be repeated to fill longer durations.

Related content at a plurality of durations may be provided to a plurality of client devices for display to users, and a skip rate or similar negative interaction rate identified 510 for each of the durations. As shown, a small amount of users may skip very short content, while a larger amount of users may skip longer content. It may be assumed that if an item of content is of infinite duration, every user paying attention to the presentation of the content would eventually choose to skip or terminate the presentation—and thus, with 100% audience engagement or interest, there would be a corresponding eventual 100% skip rate for infinite duration content. Accordingly, any difference between the theoretical 100% skip rate and a skip rate that may be extrapolated from skip rates for content of shorter durations represents an attention gap 520, or a percentage of non-engaged or not present users.

As shown, a best fit curve 512 or function may be determined based on a plurality of measured samples 510 or skip rates for the related content at different predetermined durations. The curve 512 may be extrapolated out for similar content of infinite duration as curve 514, such that the attention gap 520 may be calculated. Referring now to FIG. 5B, the calculated gap 520 may then be applied to the earlier measurements 510 to estimate the percentage of engaged, interested users for each presentation of content at each duration 530. As discussed above, contractual distribution charges or content selection algorithms may be adjusted based on the estimated attention rate 530, rather than the measured but exaggerated watch rate.

Figure 6:
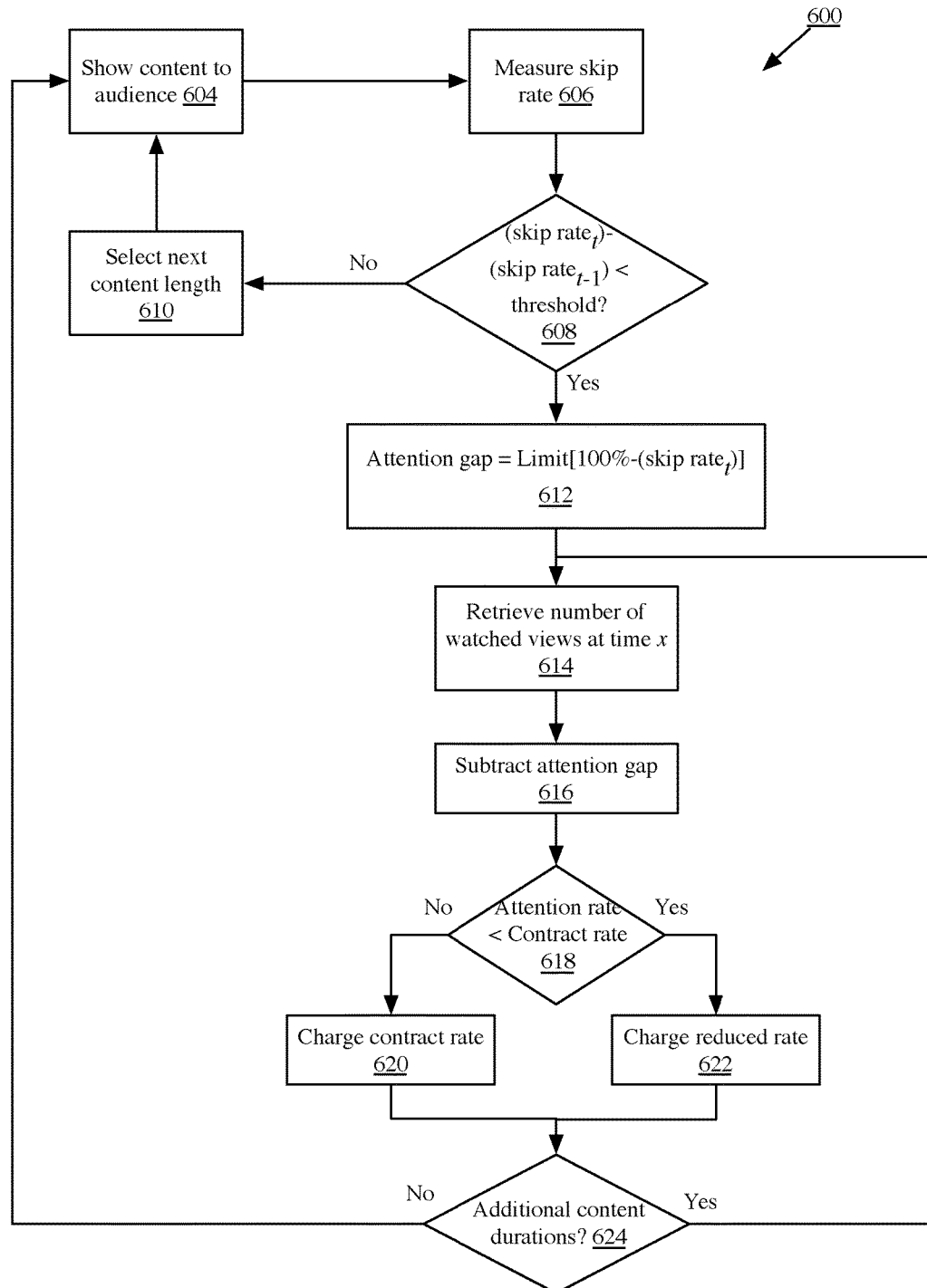
FIG. 6 is a flow chart of an implementation of a method for estimating audience engagement using temporal engagement extrapolation, according to one implementation.

FIG. 6 is a flow chart of an implementation of a method 600 for estimating audience engagement using temporal engagement extrapolation, according to one implementation.

At step 604, an item of content of a first length may be provided to a plurality of client devices. As discussed above, providing the item of content may include receiving a request for an item of content from each of the client devices, selecting the item of content, and transmitting the item of content or a uniform resource locator for the item of content to the client device. The measurement server may also receive indications of negative preference or skips of the item of content, and may measure or determine a duration-specific skip rate at step 606 based on the ratio of the number of received indications of negative preference to the number of client devices receiving the content at that duration.

At step 608, in some implementations, the measurement server may determine if a difference between two successive duration-specific skip rates (e.g. skip rate$_t$ and skip rate$_{t-1}$) is less than a predetermined threshold. For example, the measurement server may determine if a slope between the two successive measurements is near flat, or within a predetermined slop threshold. This may indicate that all of the users who were engaged with the content and would press skip at a present duration, also did so at a prior duration.

If the difference is not below the threshold (e.g. if the slope between measurements is too steep), then at step 610, another duration may be selected and a related item of content may be presented to a plurality of audience members in a repeat of steps 604-610. This may be repeated iteratively until the difference between successive skip rate measurements is less than the threshold at step 608, or accordingly, when the best fit curve between two successive skip rate measurements approaches horizontal.

At step 612, an extrapolator of the measurement system may calculate an attention gap for the presentation of the item of content based on an extrapolation of the best fit curve of the skip rate, or equal to the limit as t approaches infinity of 100% minus the skip rate measured at various times t.

In some implementations, the measurement system may associate the attention gap with the item of content. In many implementations, the association may have a predetermined expiration, such that the attention gap may be discarded or updated periodically, with additional groups of client devices receiving the content at each duration.

In some implementations, the attention gap may be applied to the measurements made to determine the attention gap, as shown in FIG. 5B. In such implementations, at step 614, the audience measurement system may retrieve (e.g. from an audience measurement database for the content) a number of views of the item of content without skipping or otherwise interacting negatively with the content, or a watch rate for the item of content at said duration. At step 616, the determined attention gap may be applied to the retrieved values or watch rate, resulting in a more accurate engaged and watched rate, compared to the rate of audience members who became disengaged before or during the presentation of the content.

As discussed above, in some implementations, a rate charged to a provider of paid content (e.g. the subject item of content) by a content distributor may be adjusted based on the attention rate. Accordingly, at step 618, in some implementations, the measurement system may determine if the attention rate is less than a specified minimum attention rate in a contract or otherwise associated with the item of content. If not, then in some implementations, at 620, the content provider may be charged the contract rate. If so, then at step 622, the contract rate may be reduced by a predetermined amount or a percentage corresponding to the attention gap. In other implementations, based on the attention rate, the content provider or distributor may select the subject item for wider distribution or may select other content that users may be interested in, based on the attention rate being above a predetermined threshold. For example, responsive to a high attention rate, a content distribution system may provide other content that is related to the subject content for automatic presentation, based on a high likelihood that the audience will remain engaged with the content.

Thus, by extrapolating skip rates for related content at various durations to a theoretical skip rate for infinite-length content, the measurement system may determine an attention gap or rate that audience members are not engaged with the content, based on a difference between the theoretical skip rate and 100%. An attention rate may then be determined by reducing the measured skip rates for the item at each duration by the attention gap, allowing the system to distinguish between users who consume content without skipping, and users who are distracted or not present during presentation of the content, without requiring test content or a paid panel.

In one implementation, this disclosure describes a method of estimating user attention to content presented by a client device. The method includes transmitting, by an audience measurement system, to each of a plurality of client devices, a first content item having a first duration. The method also includes receiving, by the audience measurement system, from each of a first subset of the plurality of client devices, an indication that a user of the client device selected to skip a portion of the first content item. The method further includes determining, by the audience measurement system, a first skip rate for the first content item based on a ratio between a size of the first subset and a size of the plurality of client devices. The method also includes transmitting, by the audience measurement system, to each of a second plurality of client devices, a second content item having a second duration different from the first duration, the second content item related to the first content item. The method also includes receiving, by the audience measurement system, from each of a second subset of the second plurality of client devices, an indication that a user of the client device selected to skip a portion of the second content item. The method also includes determining, by the audience measurement system, a second skip rate for the second content item based on a ratio between a size of the second subset and a size of the second plurality of client devices. The method further includes calculating, by the audience measurement system, from the first skip rate at the first duration and second skip rate at the second duration, an extrapolated skip rate at a third duration. The method also includes transmitting, by the audience measurement system, to each of a third plurality of client devices, a third content item. The method further includes receiving, by the audience measurement system, from each of a third subset of the third plurality of client devices, an indication that a user of the client device selected to skip a portion of the third content item. The method also includes determining, by the audience measurement system, an attention rate of the third content item based on a size of the third plurality, a size of the third subset, and the extrapolated skip rate; and adding, by the audience measurement system, an entry to a database maintained by the audience measurement system, the entry identifying the third content item and the corresponding attention rate.

In some implementations of the method, determining the attention rate further comprises calculating the attention rate by subtracting the size of the third plurality divided by the extrapolated skip rate from a difference of the size of the third plurality and the size of the third subset. In many implementations of the method, the third duration is an infinite duration. In other implementations, calculating the extrapolated skip rate further comprises calculating the extrapolated skip rate at the third duration, the third duration greater than each of the first duration and the second duration.

In some implementations, calculating the attention rate further includes determining that a device type of the plurality of client devices is a mobile device; and reducing the attention rate by an adjusted rate based on determining that the device type is the mobile device. In other implementations, the method includes determining, by the audience measurement system, that the third content item was automatically played; and calculating the attention rate based on determining that the third content item was automatically played.

In some implementations, the method includes determining, by the audience measurement system, that the third content item is a pre-roll content item or an interstitial content item associated with primary content; and calculating the attention rate based on determining that the third content item is the pre-roll content item or the interstitial content item.

In other implementations, the method includes generating, by the audience measurement system, an attention rate report for the third content item based on the attention rate retrieved from the database. In still other implementations, the method includes determining, by the audience measurement system, that the attention rate for the third content item is greater than a threshold attention rate; and transmitting, by the audience measurement system, to each of a second plurality of client devices, the third content item, responsive to determining that the attention rate is greater than the threshold attention rate.

In yet still other implementations, the method includes generating, by the audience measurement system, based on the attention rate, an invoice for a content provider associated with the third content item; and transmitting, by the audience measurement system, to the content provider, the invoice for the third content item. In a further implementation, the method includes calculating, by the audience measurement system, a discount to a per-presentation rate on the invoice for the content provider based on the attention rate.

As discussed above, in many such implementations, the collected data may be anonymized or disambiguated to protect the privacy, particularly for individuals that are not panel participants. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of estimating user attention to content presented by a client device, comprising:

transmitting, by an audience measurement system, to each of a plurality of client devices, a first content item having a first duration;

receiving, by the audience measurement system, from each of a first subset of the plurality of client devices, an indication that a user of the client device selected to skip a portion of the first content item;

determining, by the audience measurement system, a first skip rate for the first content item based on a ratio between a size of the first subset and a size of the plurality of client devices;

transmitting, by the audience measurement system, to each of a second plurality of client devices, a second content item having a second duration different from the first duration;

receiving, by the audience measurement system, from each of a second subset of the second plurality of client devices, an indication that a user of the client device selected to skip a portion of the second content item;

determining, by the audience measurement system, a second skip rate for the second content item based on a ratio between a size of the second subset and a size of the second plurality of client devices;

determining, by the audience measurement system, from the first skip rate at the first duration and second skip rate at the second duration, an extrapolation that includes a best fit curve or a limit of a function;

determining, by the audience measurement system, an extrapolated skip rate at a theoretical infinite duration using the extrapolation;

transmitting, by the audience measurement system, to each of a third plurality of client devices, a third content item;

receiving, by the audience measurement system, from each of a third subset of the third plurality of client devices, an indication that a user of the client device selected to skip a portion of the third content item;

determining, by the audience measurement system, an attention rate of the third content item based on a size of the third plurality, a size of the third subset, and the extrapolated skip rate without using an audience panel to determine a baseline; and adding, by the audience measurement system, an entry to a database maintained by the audience measurement system, the entry identifying the third content item and the corresponding attention rate, wherein determining the attention rate further comprises calculating the attention rate by subtracting the size of the third subset divided by the size of the third plurality from the extrapolated skip rate.

2. The method of claim 1, wherein calculating the attention rate further comprises:
   determining that a device type of the plurality of client devices is a mobile device; and
   reducing the attention rate by an adjusted rate based on determining that the device type is the mobile device.

3. The method of claim 1, further comprising:
   determining, by the audience measurement system, that the third content item was automatically played; and
   wherein calculating the attention rate further comprises calculating the attention rate based on determining that the third content item was automatically played.

4. The method of claim 1, further comprising:
   determining, by the audience measurement system, that the third content item is a pre-roll content item or an interstitial content item associated with primary content; and
   wherein calculating the attention rate further comprises calculating the attention rate based on determining that the third content item is the pre-roll content item or the interstitial content item.

5. The method of claim 1, further comprising:
   generating, by the audience measurement system, an attention rate report for the third content item based on the attention rate retrieved from the database.

6. The method of claim 1, further comprising:
   determining, by the audience measurement system, that the attention rate for the third content item is greater than a threshold attention rate; and
   transmitting, by the audience measurement system, to each of a second plurality of client devices, the third content item, responsive to determining that the attention rate is greater than the threshold attention rate.

7. The method of claim 1, further comprising:
   generating, by the audience measurement system, based on the attention rate, an invoice for a content provider associated with the third content item; and
   transmitting, by the audience measurement system, to the content provider, the invoice for the third content item.

8. The method of claim 7, further comprising:
   calculating, by the audience measurement system, a discount to a per-presentation rate on the invoice for the content provider based on the attention rate.

9. A system for estimating user attention to content presented by a client device, comprising:
   an audience measurement system comprising a measurement engine, and a network interface in communication with a first plurality of client devices, a second plurality of client devices, and a third plurality of client devices;
   a measurement storage device comprising a measurement database; and
   a content storage device comprising a first content item having a first duration, a second content item having a second duration different from the first duration, and a third content item;
   wherein the network interface is configured to:
      transmit, to each of the first plurality of client devices, the first content item, receive, from each of a first subset of the first plurality of client devices, an indication that a user of the client device selected to skip a portion of the first content item,
      transmit, to each of the second plurality of client devices, the second content item,
      receive, from each of a second subset of the second plurality of client devices, an indication that a user of the client device selected to skip a portion of the second content item,
      transmit, to each of a third plurality of client devices, the third content item, and
      receive, from each of a third subset of the third plurality of client devices, an indication that a user of the client device selected to skip a portion of the third content item; and
   wherein the measurement engine is configured to:
      determine a first skip rate for the first content item based on a ratio between a size of the first subset and a size of the first plurality of client devices,
      determine a second skip rate for the second content item based on a ratio between a size of the second subset and a size of the second plurality of client devices,
      determine, from the first skip rate at the first duration and second skip rate at the second duration, an extrapolation that includes a best fit curve or a limit of a function,
      determine an extrapolated skip rate at a theoretical infinite duration using the extrapolation,
      determine an attention rate of the third content item based on a size of the third plurality, a size of the third subset, and the extrapolated skip rate, without using an audience panel to determine a baseline, and
      add an entry to the measurement database identifying the third content item and the corresponding attention rate,
   wherein determining the attention rate further comprises calculating the attention rate by subtracting the size of the third subset divide by the size of the third plurality from the extrapolated skip rate.

10. The system of claim 9, wherein the measurement engine is further configured to calculate the attention rate by:
    determining that a device type of the plurality of client devices is a mobile device; and
    reducing the attention rate by an adjusted rate based on determining that the device type is the mobile device.

11. The system of claim 9, wherein the measurement engine is further configured to:
    determine that the third content item was automatically played; and
    calculate the attention rate based on determining that the third content item was automatically played.

12. The system of claim 9, wherein the measurement engine is further configured to:
    determine that the third content item is a pre-roll content item or an interstitial content item associated with primary content; and
    calculate the attention rate based on determining that the third content item is the pre-roll content item or the interstitial content item.

13. The system of claim 9, wherein the measurement engine is further configured to:
    generate an attention rate report for the third content item based on the attention rate retrieved from the database.

14. The system of claim 9, wherein the measurement engine is further configured to determine that the attention rate for the third content item is greater than a threshold attention rate; and
    wherein the network interface is further configured to transmit, to each of a second plurality of client devices, the third content item, responsive to determining that the attention rate is greater than the threshold attention rate.

15. The system of claim 9, wherein the measurement engine is further configured to generate, based on the attention rate, an invoice for a content provider associated with the third content item; and
   wherein the network interface is further configured to transmit, to the content provider, the invoice for the third content item.

16. The system of claim 15, wherein the measurement engine is further configured to calculate a discount to a per-presentation rate on the invoice for the content provider based on the attention rate.

* * * * *